3,242,183
PROCESS FOR PREPARING DIAZABICYCLO-(2,2,2)-
OCTANE FROM POLYETHYLENE POLYAMINES
Paul Magnus Torkel Matell, Bergsvagen 35; Jan Tore
Tornquist, Koppersvagen 8; and Olof Rune Steijner,
Koppersvagen 40, all of Stenungsund, Sweden
No Drawing. Filed Jan. 24, 1964, Ser. No. 339,862
Claims priority, application Sweden, Jan. 28, 1963,
897/63
8 Claims. (Cl. 260—268)

This invention relates to a process for preparing triethylene diamine, the generic name of which is 1,4-diazabicyclo-(2,2,2)-octane from polyethylene polyamines, and more particularly to a process for preparing this compound together with piperazine and aminoethyl piperazine by heating such polyamines in the liquid phase in the presence of hydrogen halide catalyst.

Triethylene diamine has the formula:

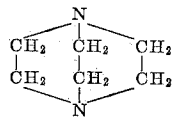

Several methods of preparing it have been described, but these generally either require starting materials which are not readily available, or give very poor yields.

A more recent method which gives better yields and uses readily available starting materials is described in U.S. Patent No. 2,937,176. According to this method, polyethylene polyamines having the general formula $$NH_2CH_2(CH_2NHCH_2)_xCH_2NH_2$$

where $x$ is an even integer $\leq 4$, are passed in the vapour phase at a temperature of from 300 to 500° C. over a silicate catalyst of the type used for cracking hydrocarbons. The vapours are then condensed, and diazabicyclo-octane is isolated from the condensate, together with other products and unreacted starting material. Such polyamines, particularly the higher polyamines, are characterized by a high boiling point, and thus the reaction requires either high temperatures, which in turn demand special arrangements and increase the risk of undesired side reactions, or low pressures, which also require special arrangements.

In accordance with this invention, diazabicyclo-octane is prepared in satisfactory yield by catalytic conversion of polyethylene polyamines in liquid phase. Hence, it is possible to carry out the process at any pressure, preferably at atmospheric pressure, and at temperatures which do not depend on the volatility of the polyamines but on such factors as yield, reaction rate and the construction of the reactor.

As starting material for preparing diazabicyclo-octane according to this invention, there can be used any polyethylene polyamine having the formula $$H_2N—(CH_2CH_2NH)_nCH_2CH_2NH_2$$

where $n$ is an integer of from about 1 to about 50, and preferably from 2 to 5.

It is also possible to start from mixtures of these polyamines, for example, the mixture which is obtained by ammonolysing 1,2-dichloro-ethane. It is advantageous to use the mixture of higher polyethylene polyamines which remains after distilling one or several of the lower polymer homologues, such as ethylene diamine, diethylene triamine, triethylene tetramine and tetraethylene pentamine, from the above-mentioned ammonolysis product of 1,2-dichloro-ethane. This possibility is of great value, since in preparing polyethylene polyamines it is not usually possible to avoid the formation of higher polymer homologues which, on distillation for recovery of the lower isomers, give a residue which cannot be distilled, and which has so far not been used to any appreciable degree. In this respect the present invention is more advantageous than previous methods, in which the polyamines were converted in gaseous phase, a process which is not possible with the higher polymer homologues.

When preparing diazabicyclo-octane according to this invention, various amounts of other nitrogenous by-products are always formed, some of which are known, for example ethylene diamine, piperazine, aminoethyl piperazine and other amines whose nature is not known.

Hydrogen halides and their ammonium salts or organic amine salts are used as catalysts according to the invention. The catalysts thus can be defined by the formula $$HX \cdot (NR_1R_2R_3)_m$$

where X is halogen, such as fluorine, chlorine, bromine or iodine, and $R_1$, $R_2$ and $R_3$ are selected from halogen, alkyl, alkylene, aryl, arylene, cycloalkyl, and cycloalkylene groups having from one to about ten carbon atoms, and can be taken together when alkylene or arylene or cycloalkylene, and $m$ is zero or one.

Exemplary are hydrogen chloride, hydrogen bromide, hydrogen iodide, ammonium fluoride, ammonium chloride, ammonium bromide, ammonium iodide, triethanol amine hydrochloride, diethanol amine hydrobromide, monoethanol amine hydroiodide, tributyl amine hydrochloride, decylamine hydrobromide, diamylamine hydroiodide, ethylene diamine hydrochloride and triethylene tetramine hydrobromide.

The mechanism whereby these compounds catalyse the conversion of the polyamines is not known. It is, however, likely that the main function of the catalyst is to convert one or more of the polyamine nitrogen atoms into an ammonium group. In the following reaction, alkylation of a nitrogen atom—which is not in ammonium form—is shown to occur with splitting of ammonia, for example in the following way:

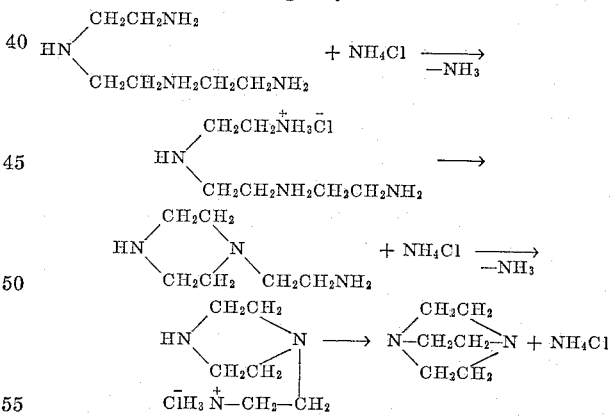

This fact shows that any substance which is capable of converting nitrogen atoms in the polyamine starting material into an ammonium group can be used as a catalyst for the conversion reaction. From a practical point of view, ammonium halides are particularly suitable for this purpose, but hydrogen halides may also be used. Organic amine salts are not so readily available and their use may involve the formation of undesirable side-products, and thus ammonium halides and hydrogen halides are preferred.

The reaction is carried out at an elevated temperature above about 200° C. and usually within the range from about 250 to about 400° C. The yield increases as the temperature rises, while the reaction time decreases. A preferable temperature range is from 270 to 350° C. The catalyst is added in an amount from about 1 to about 25% by weight of the starting materials, preferably from 5 to 10%.

The reaction may be carried out batchwise, in which case the desired amount of polyamine starting material and catalyst is heated to the desired temperature. Compounds with a lower boiling point than the starting material are formed during the reaction, and these can be separated by distillation little by little as they are formed.

Depending on the reaction conditions, from 65 to 80% of condensable reaction products are formed, calculated on the amount of polyamine starting material charged. The reaction residue amounts to from 10 to 25%, and the remainder is gaseous products, principally ammonia.

The reaction may also be carried out as a continuous process, in which case the polyamine starting material is continuously added to the reaction mixture as the reaction products are withdrawn. The by-products which are formed during the reaction may, if so desired, be returned to the reaction mixture for renewed conversion, whereby the yield of triethylene diamine increases.

Triethylene diamine may be recovered from the reaction mixture according to known separation methods, preferably by distillation. In order to obtain a pure product when recovering valuable by-products, a combination of several separation methods may be employed, for example, as described in U.S. Patent No. 2,937,176.

The following examples in the opinion of the inventor represent preferred embodiments of the invention.

EXAMPLE 1

700 grams of polyethylene polyamines with the composition: 9% diethylene triamine, 21% triethylene tetramine, 24% tetraethylene pentamine, 46% higher polyethylene polyamines, and 35 grams of ammonium chloride were heated to 270° C. The vapours were withdrawn through a column, 35×500 mm., and filled with Berl saddles, 8×8 mm., and condensed in a receiver. 456 grams of partly crystalline distillate was obtained. The amount of distillate comprised 65% and the distillation residue 20% of the polyethylene polyamines charged. The remaining 15% consisted of uncondensable gases, mainly ammonia.

The distillate was analysed by gas chromatography. The separation was carried out in a 2 meter long aluminum column, filled with 20% silicone oil on Chromosorb (a kind of diatomaceous earth specially developed for gas chromatographic work by Johns-Mansville's factories in Lompoc, California) at a temperature of 150° C. and with 60–65 ml./min. of helium as a carrier gas. The sample was injected in the form of a solution in absolute ethanol and the components were registered by a writing potentiometer coupled to the hot wire detector of the gas chromatograph.

A chromatogram of the product mixture showed the presence of several components, of which four main components could be identified by comparison with the retention times for the substances in question. The amounts of the components were calculated from the area corresponding to each component in relation to the total area of the chromatogram after correction with the factors which were determined by chromotographing syntheic mixtures of the main components in known amounts. The gas chromatographic analysis of the distillate gave the following composition: 21% triethylene diamine, 19% ethylene diamine, 21% piperazine, 16% aminoethyl piperazine and 23% unidentified substances. The yields corresponding to this analysis, calculated as the percentages by weight of the amount of starting polyamines, have been listed in Table I.

EXAMPLE 2

This test was carried out in the same way as Example 1, except that a polyamine mixture of the compoistion, 34% tetraethylene pentamine and 66% higher polyethylene polyamines, was used as the starting material. The reaction temperature was allowed to rise to 310° C. 480 grams of distillate (69%) was separated during 2.2 hours. The distillation residue amounted to 17%, and the loss in form of gaseous substances to 14%.

Gas chromatographic analysis of the distillate showed a yield of 14% triethylene diamine, 15% ethylene diamine, 24% piperazine, 28% aminoethyl piperazine and 19% unidentified substances.

EXAMPLE 3

This experiment was carried out with 700 grams of a polyamine mixture having the composition: 34% tetraethylene pentamine and 66% higher polyethylene polyamines. 35 grams of ammonium bromide was used as a catalyst, and the reaction temperature was allowed to rise to 310° C. 488 grams (70%) of distillate was separated during 2.5 hours. The distillation residue comprised 18%, and 12% of the polyamines charged were converted to gaseous substances.

Gas chromatographic analysis of the distillate gave the following composition: 13% triethylene diamine, 16% ethylene diamine, 23% piperazine, 28% aminoethyl piperazine and 20% unidentified substances.

EXAMPLE 4

This experiment was carried out in the same way as Example 3, except that the reaction temperature was allowed to rise to 350° C. 516 grams (74%) of distillate were separated during 2.3 hours. The residue comprised 17%, and the loss was 9%.

The composition of the distillate was 18% triethylene diamine, 13% ethylene diamine, 22% piperazine, 28% aminoethyl piperazine and 19% unidentified substances.

EXAMPLE 5

To 700 grams of polyamine starting material with the composition: 3% diethylene triamine, 31% triethylene tetramine, 13% tetraethylene pentamine, and 53% higher polyethylene polyamines was added 35 grams of concentrated hydrochloric acid (specific gravity=1.19), and the reaction was allowed to proceed at a maximum temperature of 310° C. 528 grams (75%) of distillate was separated during 4 hours. The distillation residue comprised 13%, and the loss 12% of the polyamines charged. The composition of the distillate was 19% triethylene diamine, 18% ethylene diamine, 21% piperazine, 26% aminoethyl piperazine and 16% unidentified products.

EXAMPLE 6

This experiment was carried out in the same way as Example 5 but with 35 grams of 40% hydrobromic acid (specific gravity=1.38) as the catalyst. 553 grams (79%) of distillate was separated during 4 hours. The distillation residue comprised 14%, and the loss 7% of the polyamines charged. Gas chromatographic analysis of the distillate gave the composition 25% triethylene diamine, 16% ethylene diamine, 18% piperazine, 28% aminoethyl piperazine and 13% unidentified substances.

EXAMPLE 7

This experiment was carried out in the same way as Example 5, except that 35 grams of ammonium fluoride was used as the catalyst. 504 grams (72%) of distillate was separated during 3.5 hours. The distillation residue comprised 15%, and the loss 13%. Gas chromatographic analysis of the distillate gave the composition 22% triethylene diamine, 18% ethylene diamine, 15% piperazine, 32% aminoethyl piperazine, and 13% unidentified products.

EXAMPLE 8

This experiment was carried out in the same way as Example 5, except that 35 grams of ammonium iodide was used as the catalyst. 537 grams (77%) of distillate was separated under 3 hours. The distillation residue comprised 15%, and the loss 8%. The composition of the distillate was 21% triethylene diamine, 17% ethylene diamine, 21% piperazine, 29% aminoethyl piperazine and 12% unidentified substances.

EXAMPLE 9

This experiment was carried out in the same way as Example 5, except that a mixture of 17.5 grams of ammonium chloride and 17.5 grams of ammonium bromide was used as the catalyst. 562 grams (80%) of distillate was separated during 1.5 hours. The distillation residue comprised 10%, and 10% of the polyamines charged were converted to gaseous form. Gas chromatographic analysis of the distillate gave the composition 24% triethylene diamine, 15% ethylene diamine, 17% piperazine, 34% aminoethyl piperazine and 10% unidentified components.

EXAMPLE 10

In a round-bottomed 1-liter flask which was equipped with a heat jacket and a contact thermometer for keeping the temperature at a constant level were introduced 700 grams of polyethylene polyamines with the composition, 34% tetraethylene pentamine and 66% higher polyethylene polyamines, and 50 grams of ammonium chloride. The mixture was heated to a maximum of 310° C., and the vapours given off were withdrawn through a 35×100 mm. column, filled with 8×8 mm. Berl saddles and condensed. The level in the still was kept constant by continuous addition of polyamines with the help of a feeding plate placed half way up the column. A total amount of 2320 grams of polyamine starting material was added in this way. 2085 grams (69%) of distillate was obtained, and the distillation residue comprised 23% and the loss in form of uncondensable gases 8%. The distillate was separated in fractions by distillation in a net tray column with 12 theoretical trays. The following four main fractions were then obtained:

| Pressure (mm. Hg) | Boiling point, °C. | Compound |
|---|---|---|
| 760 | 119–121 | Ethylene diamine. |
| 760 | 148–152 | Piperazine. |
| 760 | 172–175 | Triethylene diamine. |
| 2 | 75–76 | Aminoethyl piperazine. |

The triethylene diamine fraction comprised 18% of the primarily obtained distillate. Gas chromatographic analysis gave the composition: 17% triethylene diamine, 11% ethylene diamine, 35% piperazine, 15% aminoethyl piperazine and 22% unidentified products.

EXAMPLE 11

300 grams of polyethylene polyamines with the composition: 3% diethylene triamine, 31% triethylene tetramine, 13% tetraethylene pentamine, and 53% higher polyethylene polyamines, and 300 grams of aminoethyl piperazine were decomposed with 30 grams of ammonium chloride as the catalyst, and the temperature was allowed to rise to 310° C. 494 grams (82%) of distillate was separated during 1.5 hours. The distillation residue comprised 11%, and 7% were given off in gaseous form. Gas chromatographic analysis of the distillate gave the composition 23% triethylene diamine, 7% ethylene diamine, 8% piperazine, 57% aminoethyl piperazine and 5% unidentified substances. By the addition of aminoethyl piperazine to the polyamine starting material the yield of triethylene diamine thus increased from 10% (Example 2) to 38%, based on the polyamine starting material charged.

EXAMPLE 12

700 grams of polyethylene polyamines with the composition: 34% tetraethylene pentamine and 66% higher polyethylene polyamines, was decomposed with 7, 35, 70 and 175 grams of ammonium bromide at a maximum of 310° C. The yield of distillate and reaction time are given in the following table:

| Amount of catalyst,[1] percent | Reaction time (hours) | Amount of distillate, percent |
|---|---|---|
| 1 | 32.5 | 64 |
| 5 | 2.5 | 70 |
| 10 | 1.5 | 65 |
| 25 | 1.7 | 54 |

[1] Yields in percentages by weight of polyamine starting material charged.

*Table I*

| Example No. | Percent Yield by weight of polyamine starting material charged. | | | | | | | | | |
|---|---|---|---|---|---|---|---|---|---|---|
|  | 1 | 2 | 3 | 4 | 5 | 6 | 7 | 8 | 9 | 10 |
| PRODUCT | | | | | | | | | | |
| Triethylene diamine | 14 | 10 | 9 | 13 | 14 | 20 | 16 | 16 | 19 | 12 |
| Ethylene diamine | 12 | 10 | 11 | 10 | 13 | 13 | 13 | 13 | 12 | 8 |
| Piperazine | 14 | 17 | 16 | 16 | 16 | 14 | 11 | 16 | 14 | 24 |
| Aminoethyl piperazine | 10 | 19 | 20 | 21 | 20 | 22 | 23 | 22 | 27 | 10 |
| Unidentified substances | 15 | 13 | 14 | 14 | 12 | 10 | 9 | 10 | 8 | 15 |
| Total yield of distillate | 65 | 69 | 70 | 74 | 75 | 79 | 72 | 77 | 80 | 69 |
| Gaseous products | 15 | 14 | 12 | 9 | 12 | 7 | 13 | 8 | 10 | 8 |
| Distillation residue | 20 | 17 | 18 | 17 | 13 | 14 | 15 | 15 | 10 | 23 |
| Total | 100 | 100 | 100 | 100 | 100 | 100 | 100 | 100 | 100 | 100 |

The following is claimed:

1. A process for the production of 1,4-diazabicyclo-(2,2,2)-octane, which comprises heating a polyethylene polyamine having the general formula $$H_2N-(CH_2CH_2NH)_nCH_2CH_2NH_2$$

where $n$ is an integer from 1 to about 50 in the liquid phase in the presence of a halide catalyst selected from the group consisting of hydrogen halides and ammonium and organic amine addition salts thereof, at a temperature above about 200° C. until 1,4-diazabicyclo-(2,2,2)-octane is formed.

2. A process according to claim 1, wherein an ammonium halide is the halide catalyst.

3. A process according to claim 1, wherein a hydrogen halide is the halide catalyst.

4. A process according to claim 1, wherein an organic amine hydrohalide is the halide catalyst.

5. A process according to claim 1, wherein the temperature is within the range from about 250 to about 400° C.

6. A process according to claim 1, wherein at least a part of the by-products obtained during the reaction is returned to the reaction zone.

7. A process according to claim 1, wherein the reaction is carried out with continuous addition of polyethylene polyamine to the reaction.

8. A process according to claim 1, wherein a mixture of polyethylene polyamines are used.

No references cited.

HENRY R. JILES, *Acting Primary Examiner.*

J. W. ADAMS, JR., *Assistant Examiner.*